April 25, 1933.  W. M. BRADSHAW  1,905,262
AUXILIARY METER ATTACHMENT FOR WATTHOUR METERS
Filed July 17, 1931   2 Sheets-Sheet 1
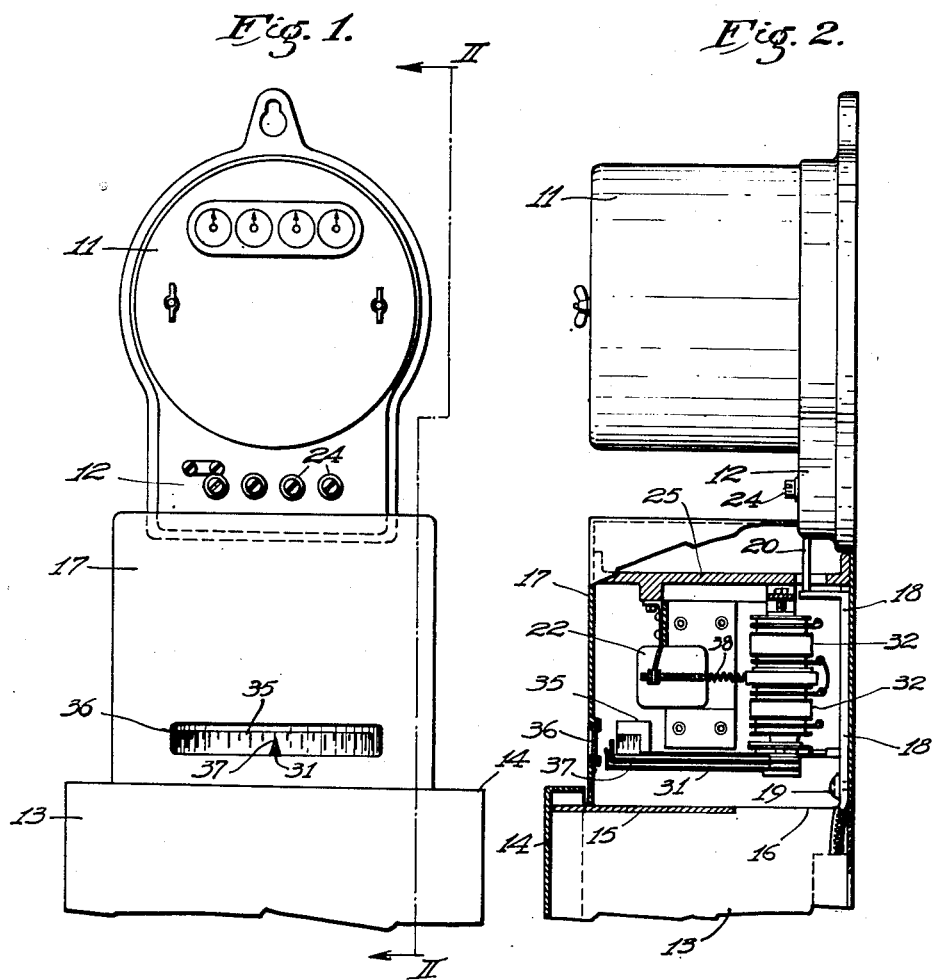
WITNESSES:—
INVENTOR
William M. Bradshaw.
BY
ATTORNEY April 25, 1933.  W. M. BRADSHAW  1,905,262
AUXILIARY METER ATTACHMENT FOR WATTHOUR METERS
Filed July 17, 1931  2 Sheets-Sheet 2
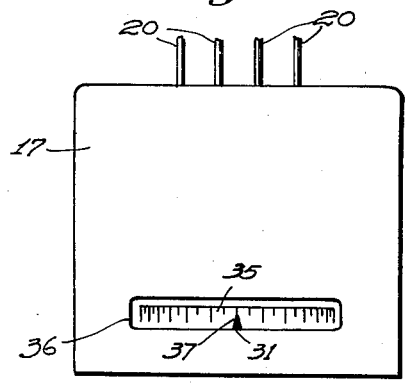
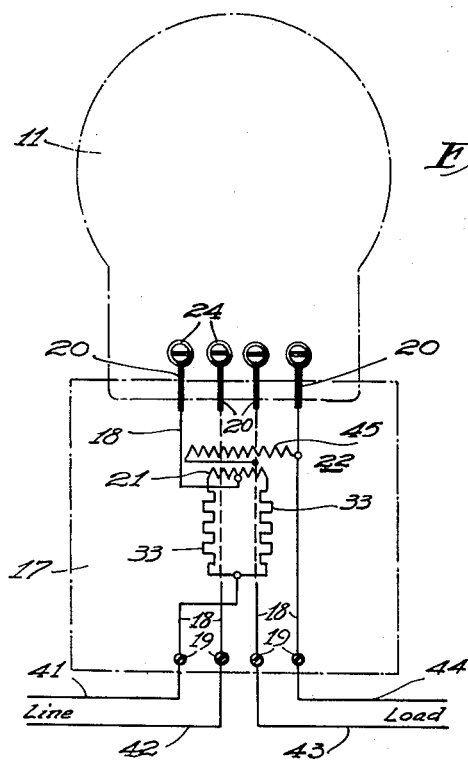

Patented Apr. 25, 1933

1,905,262

UNITED STATES PATENT OFFICE

WILLIAM M. BRADSHAW, OF SUMMIT, NEW JERSEY, ASSIGNOR TO WESTINGHOUSE ELECTRIC & MANUFACTURING COMPANY, A CORPORATION OF PENNSYLVANIA

AUXILIARY METER ATTACHMENT FOR WATTHOUR METERS

Application filed July 17, 1931. Serial No. 551,357.

My invention pertains to an attachment for watthour meters, and especially to an auxiliary meter which may be attached to a watthour meter for use simultaneously therewith and to serve also as an adapter for connecting the watthour meter to the switch box.

It is common practice to extend a service line from the power mains to the premises of a customer through an entrance switch in order that the service lines on the premises may be entirely disconnected, if desired. To measure the electrical energy consumed by the customer, a watthour meter is generally interposed between the entrance switch and the service conductors.

The entrance switch is usually mounted in a terminal box of metal which is adapted to be sealed or locked in order to prevent unscrupulous persons from wrongfully diverting current from the main conductors in advance of the meter. To protect the connections extending between the entrance switch and the meter, the latter is commonly mounted upon, or in juxtaposed relation to, the switch box with its terminals enclosed therein. For this purpose, the end wall of the switch box is provided with a suitable opening or interfitting portion to receive the terminal portion of the meter.

It is common practice, further, in many instances, to provide an adapter to facilitate the mounting of the watthour meter upon the switch box, and to enclose the leads from the switch to the meter mechanism. In accordance with the present invention, the adapter serves the additional purpose of encasing an auxiliary meter or instrument, such, for instance, as a thermal maximum demand meter, the operating mechanism of which may be electrically connected with, for energization from the energizing circuit of the watthour meter.

It is an object of my invention, therefore, to provide, in connection with an adapter disposed between a meter and associated electrical apparatus, an additional meter or instrument encased by said adapter.

Another object of my invention is to provide an auxiliary meter, such as a maximum demand meter, ammeter, wattmeter, or the like, which may be assembled in interfitting relation with another meter, and electrically associated with the energizing circuit of the latter.

A further object of my invention is to provide a meter adapter, which, in addition to its usual function affording a conduit extending between associated electrical apparatus, serves the added function of constituting a casing for an auxiliary meter, instrument, or the like.

The invention itself, however, both as to its organization and its method of operation, together with additional objects and advantages thereof, will best be understood from the following description of specific embodiments when read in conjunction with the accompanying drawings, in which:

Figure 1 is a view, in front elevation, showing my auxiliary meter attachment assembled in interposed relation between a watthour meter and a switch box;

Fig. 2 is a view, in side elevation, and partly in section taken on the line II—II of Fig. 1;

Fig. 3 is a view, in front elevation, showing one of my auxiliary meter attachments as it appears alone; and Fig. 4 is a view diagrammatically representing the electrical connections of the watthour meter and auxiliary meter according to one modification of my invention.

Referring more specifically to the drawings, the apparatus shown comprises a watthour meter 11 having a terminal casing 12, and a switch box 13 having a cover 14 which may be locked and sealed, in any well known manner, to prevent unauthorized access thereto.

The upper end wall 15 of the switch box 13 is provided with an opening 16 to receive, in interfitting relation, the terminal casing 12 of a watthour meter. In the event that the terminal casing of the particular watthour meter used will not fit the switch box provided, it is necessary to employ an adapter in a usual manner.

According to the present invention, the adapter may comprise a casing 17 suitably secured, at one end thereof, to the switch box, and the other end thereof shaped to receive the terminal portion of a watthour meter. An auxiliary meter, such as a wattmeter, ammeter, voltmeter or maximum demand meter may be disposed, as indicated in Fig. 2, within the adapter.

Bus bars or conducting strips 18 may be mounted in insulated relation within the casing 17. The lower end of each bus bar 18 is provided with a screw 19 by means of which a conductor from the switch box 13 may be secured thereto, and the upper end of each bus bar 18 may be provided with a pin 20 which protrudes above the casing 17. The pins 20 are properly spaced for plugging into the terminals 24 of the watthour meter, whereby the meter and adapter may be electrically connected by a thrust movement. Three of the bus bars extend directly through the casing 17 to the watthour meter, but the fourth is discontinuous to permit a series connection with a winding of a thermal maximum demand meter, as clearly shown in Fig. 4. A transversely disposed partition plate 25 is provided to support the auxiliary instrument mechanism within the adapter 17.

As represented in the drawings, the auxiliary instrument may be a thermal maximum demand meter, the details of which are more fully disclosed in Patent No. 1,300,283 to P. M. Lincoln. Such instrument comprises an indicating pointer 31 which is pivotally mounted on a vertical shaft which is actuated, in accordance with the load, by spiral bimetallic springs contained within cylindrical casings 32. The bimetallic springs are secured, at one end thereof, to the shaft and are heated by juxtaposed heating coils 33, which are connected in series-parallel relation with the load, through the center tapped winding 21 of a transformer 22 which is mounted in the casing 17.

A properly calibrated scale 35 is mounted adjacent the pivoted pointer, and a window 36 is provided in the adjacent wall of the casing 17 to permit reading the scale indication. A second indicating pointer 37 is pivotally mounted adjacent the first pointer 31 and is adapted to be moved as a marker to show the maximum indication of the first pointer. By means of an adjustable spring 38, the full load indication may be regulated to make the instrument indicate accurately throughout its entire range.

In Fig. 4 the outlines of the watthour meter 11 and the auxiliary meter attachment 17 are represented by dotted lines, and the circuit connections are shown diagrammatically. The line conductors 41 and 42 extend from the main switch (not shown) into the casing 17 where they are secured to the bus bars 18 by means of screws 19. The bus bar 18 to which the conductor 41 is connected is broken to provide connections which extend through two heating resistors 33 in series-parallel relation to the ends of a transformer winding 21. The circuit continues from an intermediate or center tap on the winding 21 through the upper portion of the bus bar 18 and pin 20 to the watthour meter.

The bus bar to which the conductor 42 is attached passes directly through the casing 17 to the watthour meter. From the other side of the watthour meter the connections continue downwardly through the other pair of bus bars 18 which pass directly through the casing 17 and connect with conductors 43 and 44 which comprise service conductors extending to the various outlets on the consumer's premises.

The secondary winding 45, which cooperates with the primary winding 21, is connected across the bus bars 18 corresponding to the service or load conductors 43 and 44.

It will be seen that I have provided an auxiliary meter or instrument which may be used in conjunction with a watthour meter and which is so arranged that it constitutes an adapter between the watthour meter and the switch box.

Although I have shown, purely by way of example, my invention applied to a watthour meter and its associated switch box, it is apparent that it is applicable to adapters or conduits disposed between, or used in conjunction with, various types of electrical apparatus. Further, although a thermal demand meter is shown specifically, obviously my invention embraces the use of any desired type of meter or instrument.

Obviously many modifications of the present invention are possible, and it should not be restricted, therefore, except as necessitated by the prior art and by the spirit of the appended claims.

I claim as my invention:

1. In combination with an electrical instrument and a switch box for association therewith, an adapter for facilitating the mounting of said instrument on said box, and a second electrical instrument mounted in said adapter and encased thereby.

2. In combination with an electrical instrument and electrical apparatus associated therewith, means constituting an electrical connection between said instrument and apparatus comprising a plurality of conductors, a casing for said conductors, and an additional electrical instrument mounted in said casing and electrically associated with said conductors for energization therefrom.

3. In combination with an encased electrical instrument, an auxiliary instrument including a casing having one end thereof proportioned to receive a portion of the casing of said first named instrument, and means including contact pins and sockets on said instruments for effecting an electrical connection therebetween when the elements are in operative position.

4. In an auxiliary meter attachment for watthour meters, a casing having one end open to receive a portion of the terminal casing of a watthour meter and the other end associable with a switch box whereby conductors may pass through from the switch box to the watthour meter, an auxiliary meter, and means for supporting the same within said casing.

5. In combination, a meter, a switch box and an auxiliary meter comprising conduit means for interconnecting the first named meter and the switch box.

6. In combination, an encased meter including a terminal chamber, an auxiliary instrument, a casing for said auxiliary instrument associable in interfitting relation with the terminal chamber of said meter.

7. In combination, a watthour meter adapter, and an auxiliary indicating instrument mounted therein and electrically connected with the conductors extending therethrough.

8. In combination, a watthour meter, a switch box, a thermal demand meter and a casing for the same having one end associable with the watthour meter and the other end associable with the switch box whereby it comprises an adapter for connecting the watthour meter to the switch box.

9. A meter adapter comprising a casing having a front wall and side walls, one end of said casing being associable with the terminal chamber of said meter, an indicating instrument, mounting means for supporting said instrument within the casing, plug-in connectors extending from one end of the casing, and a window in the front wall of the casing.

In testimony whereof, I have hereunto subscribed my name this 7th day of July 1931.

WILLIAM M. BRADSHAW.